June 14, 1932.  C. V. BUDDENBROCK  1,862,815

THEFTPROOF GASOLINE TANK

Filed March 27, 1929

CHARLES V. BUDDENBROCK
INVENTOR

PER Albert J. Fihe
ATTORNEY

Patented June 14, 1932

1,862,815

UNITED STATES PATENT OFFICE

CHARLES V. BUDDENBROCK, OF TRINIDAD, COLORADO

THEFTPROOF GASOLINE TANK

Application filed March 27, 1929. Serial No. 350,332.

This invention relates to improvements in theftproof gasoline tanks, and has for one of its principal objects the provision of a gasoline tank, particularly for automobiles or the like, which will be proof against the siphoning off of the fuel therefrom.

One of the important objects of this invention is to provide a fuel or gasoline tank for automobiles or the like which can be readily filled, but which will positively resist and prevent any unauthorized withdrawal of fuel therefrom, while at the same time permitting the insertion of a stick or similar gauge for determining the height of liquid in the tank.

Still another and further important object of this invention is to provide in a gasoline tank a theftproof device which at the same time will provide means for straining the gasoline or other fuel when it is placed in the tank so as to assure to the user a pure source of power.

Other and further important objects of the invention will be apparent from the disclosures in the accompanying drawing, and following specifications.

The invention, in a preferred form, is illustrated in the drawing and hereinafter more fully described.

Figure 1:
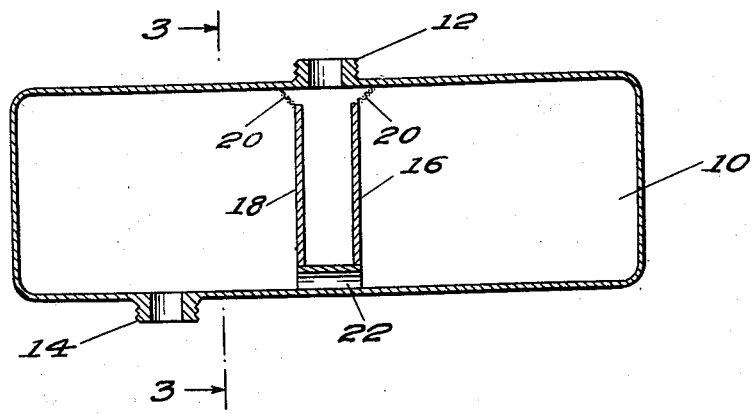
Figure 1 is a vertical sectional elevation of the improved theftproof gas tank of this invention.

The reference numeral 10 indicates generally a gasoline tank or the like for automobiles which obviously may be of any desired size or shape, and which may be positioned in any convenient place on an automobile, truck, tractor, motorboat, airplane, or other power-driven vehicle.

The tank is provided with the usual inlet opening 12 and an outlet 14 at the bottom thereof, and positioned directly beneath the inlet opening 12, which in this case is shown as approximately in the middle of the tank but which may be positioned elsewhere if desired, is a pair of parallel walls 16 and 18 which extend downwardly through the tank and are positioned relatively close together so as to enclose therebetween a relatively small amount of fuel even when the tank is full.

Each wall 16 extends completely across the tank and terminates at a short distance from the top thereof, having positioned between its upper edge and the roof of the tank, a screen or sieve 20, which is preferably equally positioned with respect to each wall so as to afford a greater space for incoming gasoline or the like.

Figure 3:
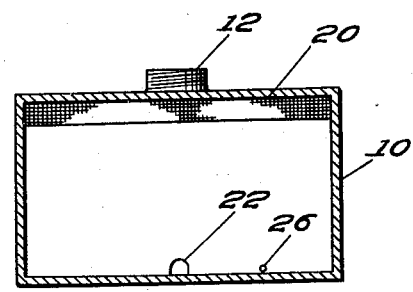
Figure 3 is a sectional view taken on the line 3—3 of Figure 1.

As best shown in Figures 1 and 3, a channel 22 connects the two ends of the tank, which are now divided by means of the walls 16 and 18, with each other, this channel being in the form of a tube or the like extending adjacent the bottom of the tank and connecting the spaces set off by the walls 16 and 18 respectively. Obviously, this allows fuel to flow from all parts of the tank, except that enclosed between the walls 16 and 18, to the outlet 14.

A very small opening 26 is formed in the wall 18 whereby the fuel between the partitions 16 and 18 will be allowed to trickle into the tank proper as the level of the gasoline in the main tank subsides. Similarly, this opening maintains a constant level between the gasoline in all parts of the tank, particularly that enclosed between the partitions 16 and 18, thereby making it easy to insert a stick or the like into the tank with the idea of accurately determining the amount of fuel therein.

It will be evident that the positioning of the partitions 16 and 18 close together will result in the enclosing therebetween of a relatively small quantity of fuel, which even though siphoned off by some unauthorized person or other thief will not cause a serious loss, while at the same time it enables the owner or user of the automobile to withdraw small quantities in the event that the same are necessary for other uses, such as for example a camp stove, road vulcanizer, or the like.

Figure 4:
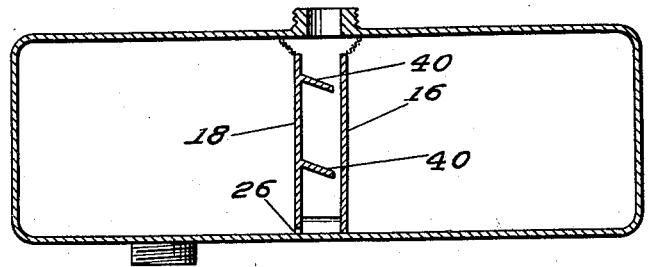
Figure 4 is a vertical sectional view illustrating a slight modification.

In the modification shown in Figure 4, a plurality of baffle plates 40 are positioned between the partitions 16 and 18, preferably extending across the tank and almost joining the partitions, leaving, however, a small space between the end of each baffle plate and the partition 16. This allows of the insertion of a flat stick or the like into the tank to ascertain the amount of fuel therein, while at the same time eliminates the possibility of using any but a very small tube for siphoning purposes, which operation would be therefore too slow for the ordinary gasoline thief.

Figure 2:
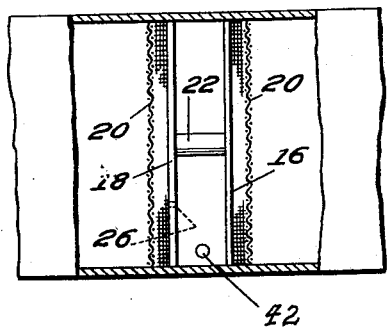
Figure 2 is a top plan view of the central part of the tank, looking downwardly therein.

As shown at 42 in Figure 2 a drain opening may be provided in the bottom of the tank which may be either between the walls 16 and 18 or which may be in one of the end compartments. This is adapted to be closed by a plug which can be locked in place by a key-operated lock so that in the event that the owner or authorized operator of the car desires a supply of gasoline in an emergency, it can be readily obtained. Naturally, the opening 42 if positioned between the walls 16 and 18 should be as far as possible from the pipe or connecting element 22 so that there will be no opportunity of puncturing said pipe by means of a sharp instrument or the like inserted through the opening, and the opening should also be relatively small so that there is no possibility of puncturing the walls 16 or 18 by the introduction of such instruments therethrough.

Obviously herein is provided a theftproof gas tank which will be quite a boon to automobilists, truck owners, and the like who heretofore have experienced quite serious losses owing to theft of gasoline from tanks while the cars were in garages or even unguarded on the road, and this will particularly apply to truck owners whose drivers usually have cars of their own and never buy gasoline.

I am aware that many changes may be made and numerous details of construction varied throughout a wide range without departing from the principles of this invention, and I therefore do not purpose to limit the patent granted herein otherwise than as necessitated by the prior art.

I claim as my invention:

1. A theftproof gasoline tank, comprising in combination with the tank, a plurality of partitions beneath the inlet opening of the tank, and gasoline strainers at the tops of the partitions, at least one of the partitions having a relatively small hole therein to allow gasoline from the main portion of the tank to slowly flow into the space defined by the partitions.

2. A theftproof gasoline tank, comprising in combination with the tank, a plurality of partitions beneath the inlet opening of the tank gasoline strainers at the tops of the partitions and baffle plates between the partitions, at least one of the partitions having a relatively small hole therein to allow gasoline from the main portion of the tank to slowly flow into the space defined by the partitions.

In testimony whereof I affix my signature.

CHARLES V. BUDDENBROCK.